(12) United States Patent
Sailor et al.

(10) Patent No.: US 12,194,538 B2
(45) Date of Patent: Jan. 14, 2025

(54) INLET MANIFOLD FOR A LAMINAR GAS FLOW IN A LASER POWDER BED FUSION SYSTEM

(71) Applicant: Northrop Grumman Systems Corporation, Falls Church, VA (US)

(72) Inventors: Anna Sailor, Baltimore, MD (US); Brant E. Stoner, Millersville, MD (US); John Wojtowicz, III, Manchester, MD (US); Megan Emma Cooney, Baltimore, MD (US); Shawn D. Leonard, Finksburg, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 325 days.

(21) Appl. No.: 17/388,504

(22) Filed: Jul. 29, 2021

(65) Prior Publication Data
US 2022/0347758 A1    Nov. 3, 2022

(51) Int. Cl.
*B22F 12/70* (2021.01)
*B22F 10/28* (2021.01)
(Continued)

(52) U.S. Cl.
CPC .............. *B22F 12/70* (2021.01); *B22F 10/28* (2021.01); *B22F 12/30* (2021.01); *B22F 12/41* (2021.01); *B22F 2201/11* (2013.01)

(58) Field of Classification Search
CPC .......... B22F 12/70; B22F 10/28; B22F 12/30; B22F 12/41; B22F 2201/11; B22F 10/77;
(Continued)

(56) References Cited

U.S. PATENT DOCUMENTS

2015/0285502 A1* 10/2015 DiCintio ............ B23K 15/0086
60/737
2016/0131165 A1    5/2016 Collins
(Continued)

FOREIGN PATENT DOCUMENTS

DE    102014205875 A1 * 10/2015 ............ B22F 3/1055
DE    102018219304 A1 *  5/2020 ............. B22F 10/20
(Continued)

OTHER PUBLICATIONS

International Search Report and Written Opinion in corresponding International Application No. PCT/US22/35278, issued Nov. 3, 2022, 12 pages.
(Continued)

*Primary Examiner* — Keith D. Hendricks
*Assistant Examiner* — Moriah S. Smoot
(74) *Attorney, Agent, or Firm* — Dority & Manning, P.A.

(57) ABSTRACT

An inlet manifold is for use in a laser powder bed fusion system having a build platform for carrying a powder bed and a pump or blower for supplying a gas flow in a direction relative to a surface of the build platform. The inlet manifold is made of a gas flow guide structure having a gas flow inlet to receive the gas flow and being comprised of a plurality of stacked gas flow guides, each being defined by top and bottom guide plates oriented downwards at an angle A relative to the direction of the gas flow for guiding the gas flow downwards towards a gas flow outlet. At least some of the top and the bottom guide plates have upwardly curved ends at the gas flow outlet to redirect the gas flow to be substantially parallel to the surface of the build platform.

20 Claims, 8 Drawing Sheets

(51) Int. Cl.
*B22F 12/30* (2021.01)
*B22F 12/41* (2021.01)

(58) Field of Classification Search
CPC ....... B22F 10/322; B33Y 30/00; B33Y 50/02; Y02P 10/25
See application file for complete search history.

(56) References Cited

U.S. PATENT DOCUMENTS

| | | | |
|---|---|---|---|
| 2017/0087635 | A1 | 3/2017 | Wilkes et al. |
| 2017/0120330 | A1 | 5/2017 | Sutcliffe et al. |
| 2017/0216916 | A1 | 8/2017 | Nyrhila et al. |
| 2019/0366434 | A1 | 12/2019 | Upadhye et al. |
| 2021/0094234 | A1 | 4/2021 | Patel et al. |
| 2021/0101341 | A1 | 4/2021 | Zhang et al. |

FOREIGN PATENT DOCUMENTS

| | | |
|---|---|---|
| WO | 2019231966 A1 | 12/2019 |
| WO | 2020041451 A1 | 2/2020 |

OTHER PUBLICATIONS

Daniel O'Connor, EOS launches new machine, TCT Magazine, https://www.tctmagazine.com/additive-manufacturing-3d-printing-news/eos-launch-new-machine/, Dec. 3, 2013, 4 pages.

Florian Wirth et al., Influence of the Inert Gas Flow on the Laser Powder Bed Fusion (LPBF) Process, Industrializing Additive Manufacturing, https://www.researchgate.net/publication/344034515_Influence_of_the_Inert_Gas_Flow_on_the_Laser_Powder_Bed_Fusion_LPBF_Process, Jan. 2021, 14 pages.

Haopeng Shen et al., Influence of Gas Flow Speed on Laser Plume . . . , 2020 The Minerals, Metals & Materials Society, JOM, vol. 72, No. 3, 2020, The 2nd Asia-Pacific International Conference On Additive Manufacturing (APICAM 2019), https://link.springer.com/article/10.1007/s11837-020-04020-y, Jan. 17, 2020, 13 pages.

Zhang Guoqing et al., 3D metal printer dust filter structural optimal design and key performance research, ScienceDirect, Materials & Design, https://www.sciencedirect.com/science/article/pii/S0264127519305520?via%3Dihub, Aug. 9, 2019, 8 pages.

\* cited by examiner

INLET MANIFOLD FOR A LAMINAR GAS FLOW IN A LASER POWDER BED FUSION SYSTEM

TECHNICAL FIELD

The present disclosure relates generally to laser powder bed fusion systems, and more particularly to techniques and mechanisms for producing a laminar gas flow over a powder bed carried on a build platform of a laser powder bed fusion system with use of an inlet manifold.

BACKGROUND

Powder bed fusion is an additive manufacturing process that may be used to produce high-quality metal components. Powder bed fusion involves a layer-by-layer solidification of a material, such as a metal powder, using a laser beam of a laser. In this process, a powder layer of metal powder is deposited over a powder bed carried on a build platform in a build chamber. A laser beam is scanned across portions of the powder layer that correspond to a cross-section of the component being manufactured. The laser beam melts or sinters the powder to form a solidified layer. After selective solidification of a layer, the powder bed is lowered by a thickness of the newly solidified layer, and a next layer of powder is spread over the surface and solidified in the same manner. This process is repeated a number of times until the component is completed.

During the melting or sintering process, debris (e.g. condensate, unsolidified particles of powder, etc.) is produced within the build chamber. Ejected debris may be deposited on areas of the powder layer that have not yet solidified. Unfortunately, this may produce undesirable surface roughness and layers of non-uniform thickness, which may create defects (e.g. pores, inclusions, etc.) in the manufactured components.

In an attempt to remove debris during the process, a gas flow of an inert gas may be directed over the powder bed. In some system designs, the gas flow may be introduced into the build chamber through an inlet manifold and collected by an outlet or exhaust manifold to recirculate the gas and collect debris. However, problems may occur with this process in commercially-available laser powder bed machines. In these machines, the inlet manifold may be made of a folded and welded sheet metal structure that guides the gas flow at a downwards angle towards the powder bed.

Unfortunately, use of such an inlet manifold results in an uneven powder bed. Thicker layers of powder result in a greater quantity of ejected condensate and require higher gas flow rates to keep the laser path clear. At higher velocities, the gas flow disrupts the powder bed and stirs up airborne particulate matter, resulting in a significant amount of welding spatter to land on and be incorporated into printed parts. Printed components may turn out to have undesirable material properties.

SUMMARY OF THE INVENTION

It has been discovered that one or more of the disadvantages associated with conventional laser powder bed fusion systems may be caused by turbulence in the gas flow due to the design of the inlet manifold. Example embodiments of the present disclosure improve the performance of a laser powder bed fusion system by producing a laminar gas flow over a powder bed carried on a build platform of a laser powder bed fusion system with use of an inlet manifold as described herein.

In one illustrative example, an inlet manifold is configured for use in a laser powder bed fusion system having a build platform for carrying a powder bed and a pump or blower for supplying a gas flow in a direction relative to the build platform. The inlet manifold has a gas flow guide structure which includes a gas flow inlet to receive the gas flow. The gas flow guide structure is comprised of a plurality of stacked gas flow guides, where each stacked gas flow guide is defined by top and bottom guide plates oriented downwards at an angle A relative to the direction of the gas flow to guide the gas flow downwards towards a gas flow outlet. At least some of the top and the bottom guide plates of the stacked gas flow guides have upwardly curved ends at the gas flow outlet to redirect the gas flow to be substantially parallel to a surface of the build platform.

In another illustrative example, a method for producing a laminar gas flow over a powder bed carried on a build platform of a laser powder bed machine having a pump or blower for supplying a gas flow into an inlet manifold is described. The inlet manifold has a gas flow guide structure comprised of a plurality of stacked gas flow guides, where each stacked gas flow guide is defined by top and bottom guide plates which are oriented downwards at an angle A at a gas flow inlet and by at least some of the top and the bottom guide plates having upwardly curved ends at a gas flow outlet. The method involves receiving, at the gas flow inlet of the gas flow guide structure, the gas flow in a direction relative to a surface of the build platform; guiding, via the plurality of stacked gas flow guides of the gas flow guide structure, the gas flow downwards at the angle A towards the gas flow outlet; and redirecting, via the upwardly curved ends of the at least some of the top and the bottom guide plates, the gas flow from the gas flow outlet to be substantially parallel to the surface of the build platform.

In yet another illustrative example, a laser powder bed fusion system comprises a build chamber having a build platform to carry a powder bed, a laser device to produce a laser beam to fuse layers of powder from the powder bed, a pump or blower to supply a gas flow in a direction relative to a surface of the build platform, and an inlet manifold having a gas flow inlet to connect to the pump or blower to receive the gas flow. The inlet manifold has a gas flow guide structure comprised of a plurality of stacked airflow guides. Each stacked gas flow guide is defined by top and bottom guide plates oriented downwards at an angle A relative to a direction of the gas flow to guide the gas flow downwards towards a gas flow outlet into the build chamber. At least some of the top and the bottom guide plates have upwardly curved ends at the gas flow outlet to redirect the gas flow to be substantially parallel to the surface of the build platform.

More detailed and alternative techniques and implementations are provided herein as described below.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DETAILED DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

According to some embodiments of the present disclosure, what is described herein is an inlet manifold for directing a gas flow within a build chamber of a laser powder bed machine to produce a laminar flow over a powder bed carried on a build platform, for a reduced or eliminated flow turbulence and an improved debris removal for producing printed components with desirable material properties.

Figure 1:
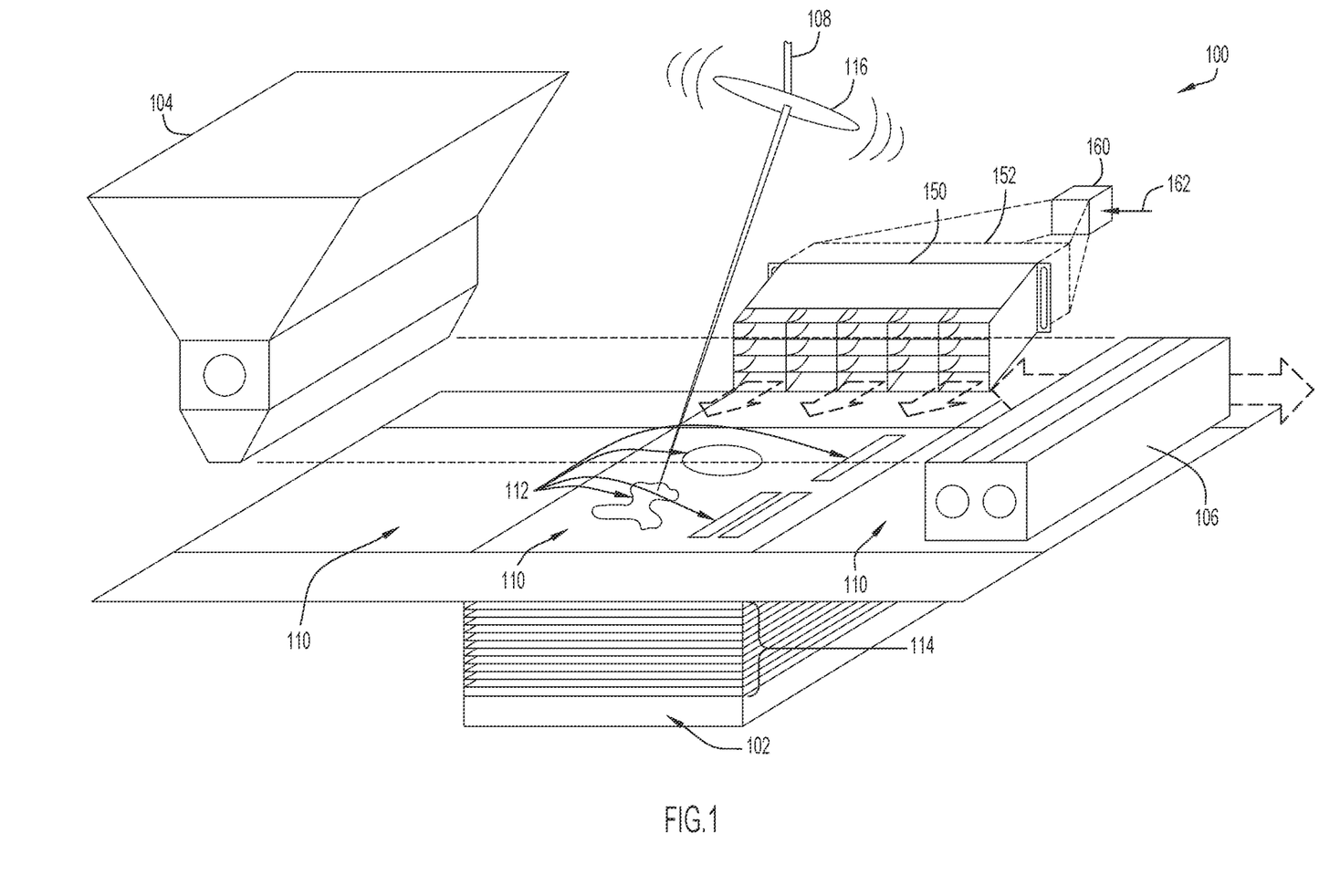
FIG. 1 is an illustrative representation of a laser powder bed fusion system according to some embodiments of the present disclosure, where the laser powder bed fusion system includes an inlet manifold to produce a laminar gas flow over a powder bed carried on a surface of a build platform of the laser powder bed fusion system.

FIG. 1 is an illustrative representation of a laser powder bed fusion system 100 according to some embodiments of the present disclosure. Laser powder bed fusion system 100 may be utilized for additive manufacturing of high-quality metal parts. More particularly, laser powder bed fusion system 100 may be operative to perform a powder bed fusion (PBF) process.

Powder bed fusion is an additive manufacturing process that involves a layer-by-layer solidification of a material, such as a metal powder, using a laser beam of a laser. To implement this process, a build chamber of laser powder bed fusion system 100 may include a powder tank 104 for dispensing metal powder over a build platform 102. A powder bed 110 of metal powder may therefore be carried on a surface of a build platform 102. A laser beam of a laser device 108 may be scanned across portions of a top powder layer that correspond to a cross-section of a component to be manufactured. Here, a scanning head 116 may be used to control movement of the laser beam. The laser beam may melt or sinter the powder to form one or more solidified powder layer areas 112. After selective solidification of a layer, powder bed 110 may be lowered (see a downward arrow in FIG. 1) by a thickness of the newly-solidified layer, and a next layer of powder may be recoated or spread over the surface using a recoating mechanism 106 (see a left-right arrow in FIG. 1) and solidified in the same manner. This process may be repeated a number of times (e.g. see a plurality of previously-processed/solidified layers 114) until the component(s) is completed.

During the melting or sintering process, debris (e.g. condensate, unsolidified particles of powder, etc.) is produced within the build chamber. To remove debris during the process, a gas flow may be directed over powder bed 110 in the build chamber. For this purpose, a pump or blower 160 may be used to supply a gas flow of an inert gas (e.g. argon) into the build chamber. Pump or blower 160 may be connected to a gas flow inlet of an inlet manifold 150 via a connecting interface 152. The supply and/or the flow rate of the gas flow from pump or blower 160 may be controlled in accordance with a control signal 162.

In some embodiments, pump or blower 160 may supply the gas flow to the gas flow inlet of inlet manifold 150 in a direction relative (e.g. parallel) to the surface of build platform 102. In some further embodiments, pump or blower 160 may connect to the gas flow inlet of inlet manifold 150 via the connecting interface 152 at an elevated height relative to a surface of build platform 102 and/or powder bed 110. With this configuration, the gas flow may be introduced into the build chamber through inlet manifold 150 and collected by an outlet or exhaust manifold (not shown in FIG. 1) in order to recirculate the gas and collect debris.

According to the present disclosure, inlet manifold 150 is configured to receive the gas flow from pump or blower 160 and guide and redirect the gas flow at a gas flow outlet to produce a laminar gas flow over powder bed 110 carried on build platform 102.

Figure 2:
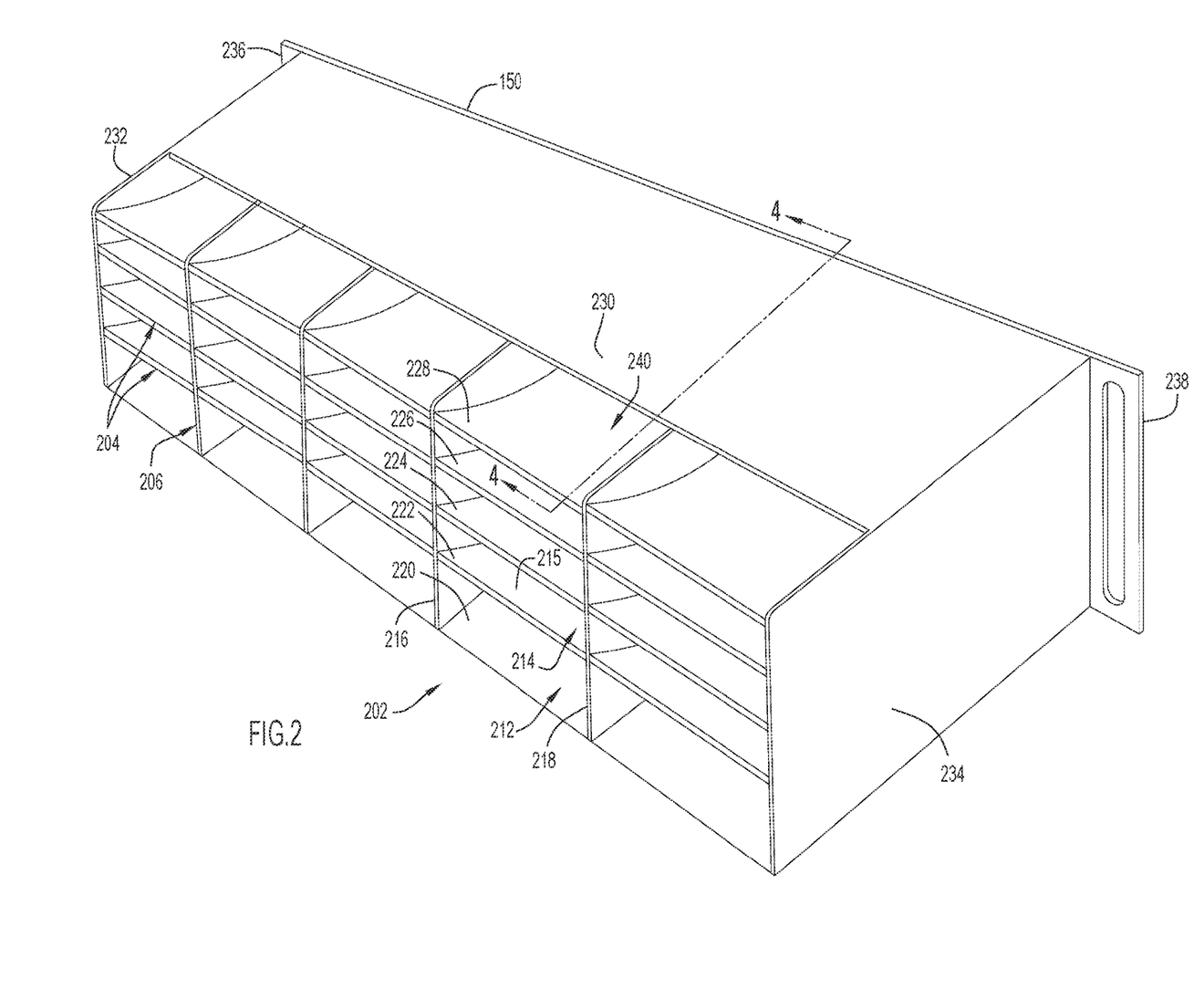
FIG. 2 is a perspective view of the inlet manifold according to some embodiments of the present disclosure taken from front and right sides.
Figure 3:
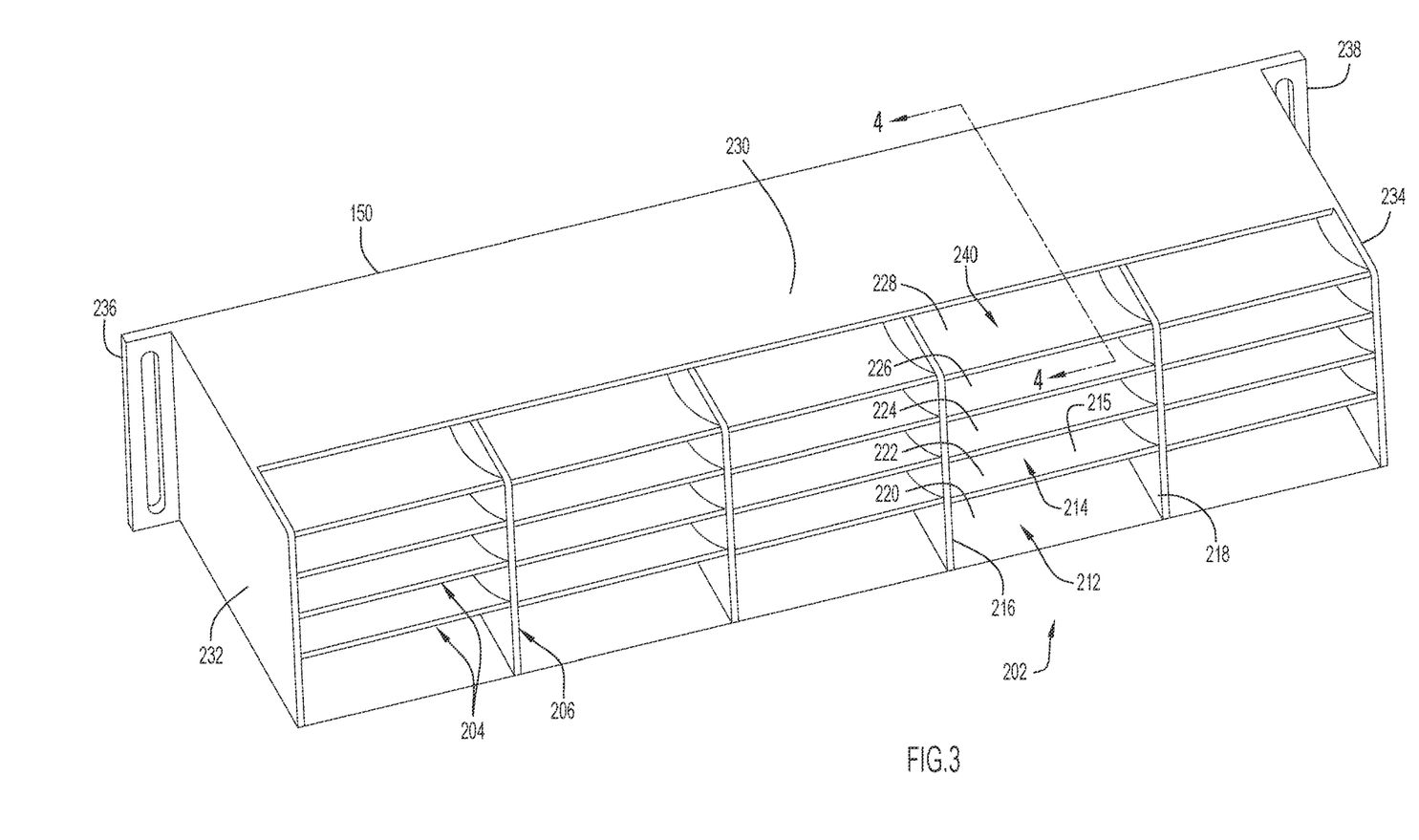
FIG. 3 is another perspective view of the inlet manifold according to some embodiments of the present disclosure taken from front and left sides.

FIG. 2 is a perspective view of inlet manifold 150 according to some embodiments of the present disclosure taken from front and right sides. FIG. 3 is another perspective view of inlet manifold 150 according to some embodiments taken from front and left sides. Note that the perspective views of the front and right/left sides of inlet manifold 150 in FIGS. 2 and 3 illustrate the gas flow outlet from which the gas flow may exit inlet manifold 150 and enter into the build chamber of the system. For further illustration of inlet manifold 150, FIG. 4 is a cross-sectional view 400 of inlet manifold 150 taken along a line 4-4 of FIG. 2 or FIG. 3.

Figure 4:
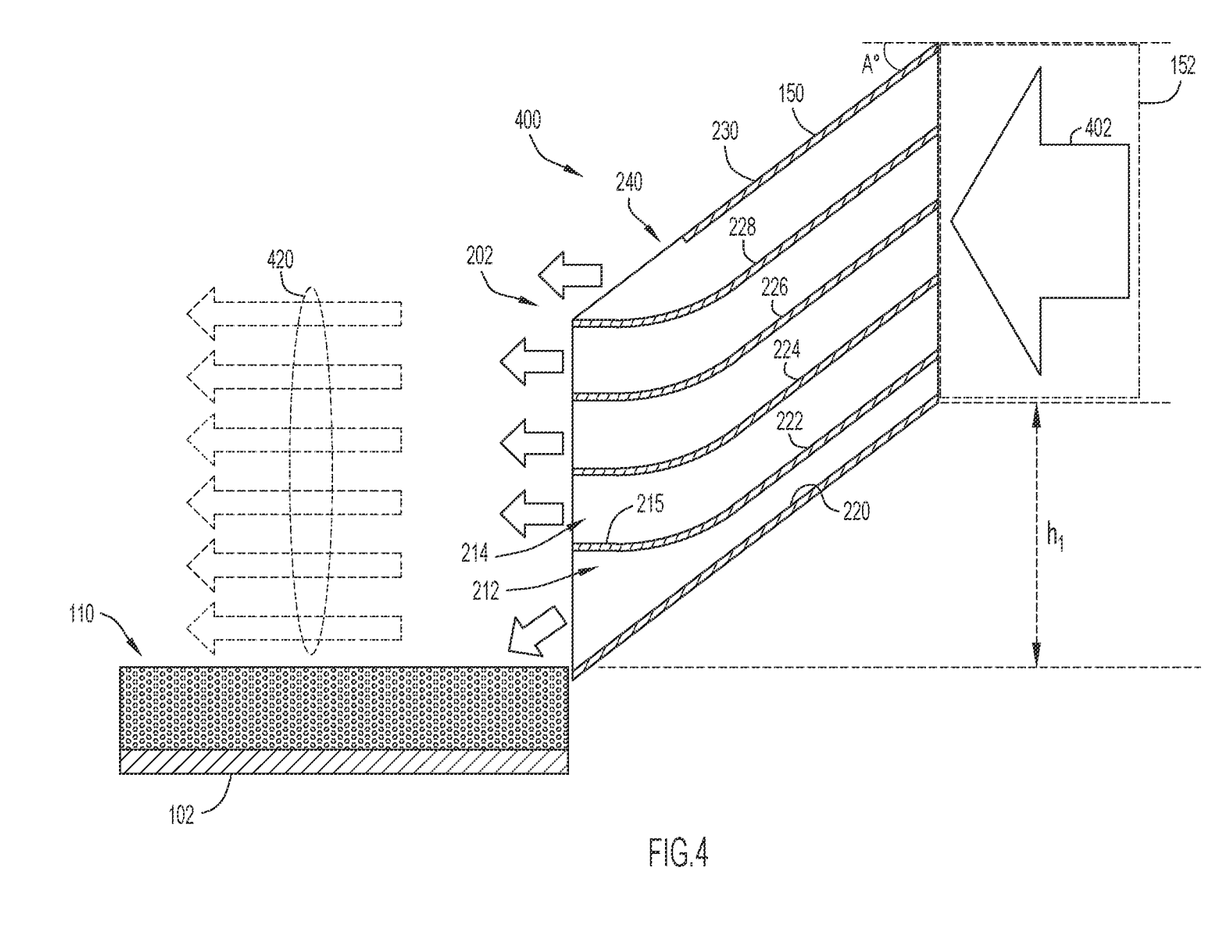
FIG. 4 is a cross-sectional view of the inlet manifold according to some embodiments of the present disclosure, taken along a line 4-4 of FIG. 2 or FIG. 3.

Inlet manifold 150 of FIGS. 2-4 has as a gas flow guide structure that may be mounted for use in the laser powder bed fusion system of FIG. 1. For this purpose, the gas flow guide structure of inlet manifold 150 may include mounting brackets 236 and 238 on left and right sides thereof, respectively. Mounting brackets 236 and 238 may be used for mounting or securing inlet manifold 150 (e.g. with use of screws, bolts, fasteners, or other securing means) onto the laser powder bed fusion system of FIG. 1. In some embodiments, mounting brackets 236 and 238 may be integrally formed with the gas flow guide structure.

In general, the gas flow guide structure of inlet manifold 150 is comprised of a plurality of stacked gas flow guides 202. The plurality of stacked gas flow guides 202 may be or include vertically-stacked gas flow guides. For example, the plurality of stacked gas flow guides 202 may include stacked gas flow guides 212 and 214 that are stacked in a vertical direction. In the embodiment shown in FIGS. 2-4, the number of stacked gas flow guides 202 in the vertical direction is five (5). In some embodiments, the number of the stacked gas flow guides 202 in the vertical direction may be between four (4) and twelve (12).

Each one of the plurality of stacked gas flow guides 202 may be defined at least in part by a plurality of guide plates 204 which include top and bottom guide plates. Here, each top guide plate of a given stacked gas flow guide may form the bottom guide plate of the gas flow guide that is stacked directly over it. For example, in the embodiment shown in FIGS. 2-4, the gas flow guide structure is shown to include guide plates 220 and 222 which are top and bottom guide plates of stacked gas flow guide 212, and guide plates 222 and 224 which are top and bottom guide plates of stacked gas flow guide 214.

Additional guide plates that are indicated the embodiment shown in FIGS. 2-4 include guide plates 224 and 226 which are top and bottom guide plates of another stacked gas flow guide that is stacked over stacked gas flow guide 214; guide plates 226 and 228 which are top and bottom guide plates of yet another stacked gas flow guide that is stacked over the previously-mentioned gas flow guide; and guide plates 228 and 230 which are top and bottom guide plates of yet even another stacked gas flow guide that is stacked over the previously-mentioned gas flow guide. As illustrated, guide plate 230 may be or be formed by a top plate of the entire gas flow guide structure of inlet manifold 150. In some embodiments, guide plate 230 which serves as the top plate is shortened in length at the gas flow exit of the gas flow guide structure, to form an opening 240 to expose each top one of the stacked gas flow guides 202 to the open air of the build chamber for a less restricted gas flow.

In some embodiments, the gas flow guide structure of inlet manifold 150 may further include a plurality of vertical guide plates 206 to provide further separation of the plurality of stacked gas flow guides 202. For example, the plurality of vertical guide plates 206 may include vertical guide plates 216 and 218 which further define stacked gas flow guides 212 and 214. Also as shown, leftmost and rightmost vertical guide plates 232 and 234 of the gas flow guide structure may be or be formed by left and right sides, respectively, of the entire gas flow guide structure.

As further illustrated in FIGS. 2-3, the plurality of vertical guide plates 206 may separate the plurality of stacked gas flow guides 202 into a plurality of horizontally-separated, vertically-stacked gas flow guide "stacks." Each horizontally-separated stack may be disposed adjacent to and share a vertical guide plate with an adjoining stack on either one of its sides. In some embodiments, each horizontally-separated, vertically-stacked gas flow guide stack may be substantially the same as or identical to each other stack. In some embodiments, the number of the horizontally-separated, vertically-stacked gas flow guide stacks may be between four (4) and twelve (12). In the embodiment of FIGS. 2-4, the number of horizontally-separated, vertically-stacked gas flow guide stacks is five (5), which form a total of twenty-five (25) gas flow guides in the gas flow guide structure (i.e. 5×5 gas flow guides). In some embodiments, each one of (many, most or all of) the stacked gas flow guides 202 has the same or similar dimensions as each other stacked gas flow guide.

In some embodiments, the gas flow guide structure of inlet manifold 150 is made of a metal or metal alloy. In some embodiments, the gas flow guide structure of inlet manifold 150 is made of a metal or metal alloy of titanium, Inconel, stainless steel, or other variety of steel. In some further embodiments, the gas flow guide structure of inlet manifold 150 is an integrally-formed, additively-manufactured unit (e.g. a 3D laser-printed unit) that is made of such metal or metal alloy. Note that any other suitable material(s) or technique(s) may be utilized to produce the gas flow guide structure. Inconel® represents a family of austenitic nickel-chromium-based superalloys and is a registered trademark of Special Metals Corporation of New Hartford, New York, U.S.A.

As is apparent from the construction of the gas flow guide structure of inlet manifold 150 of FIGS. 2-4, the gas flow through inlet manifold 150 may be split into multiple gas flows that are more restricted and better controlled.

Figure 5:
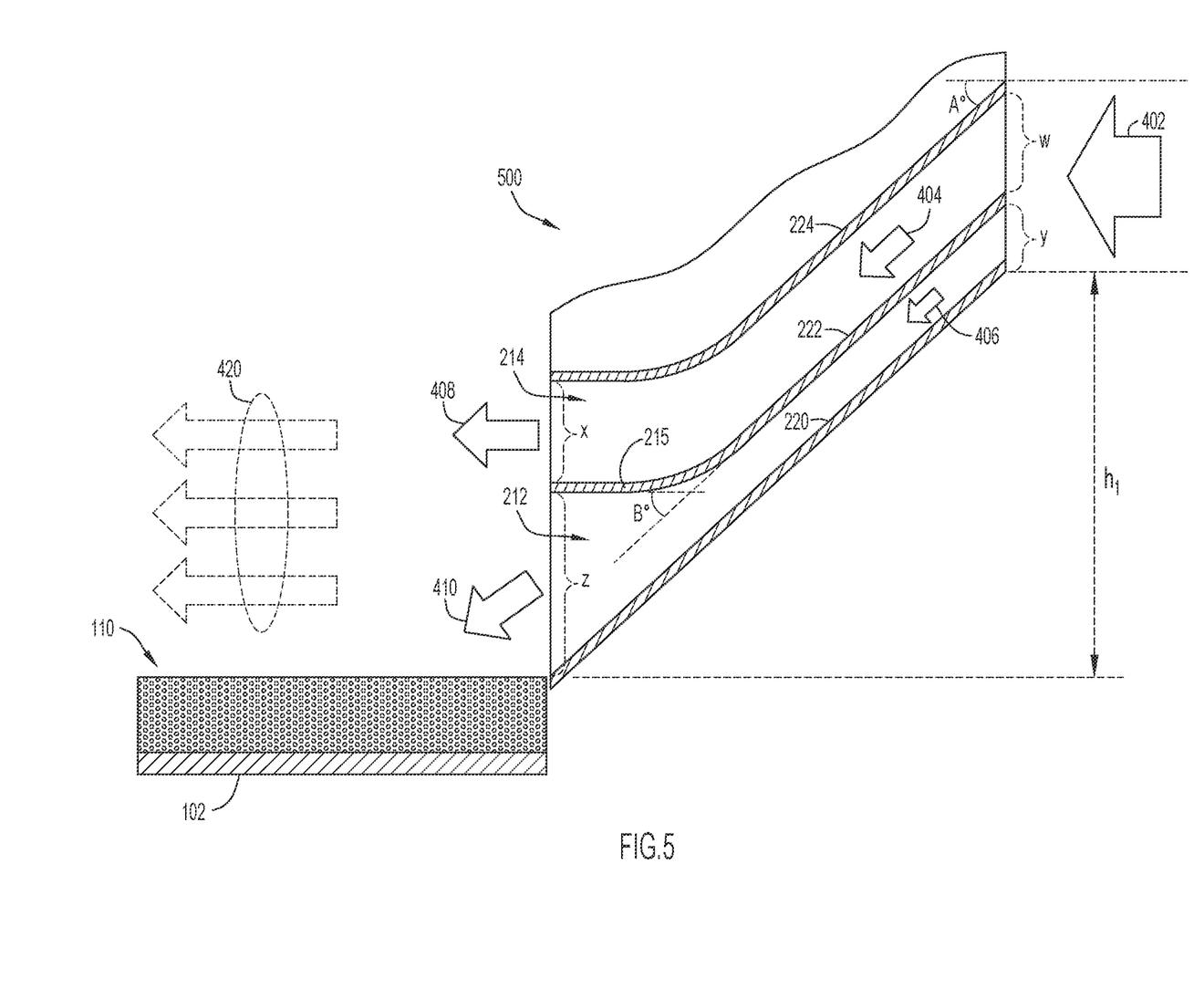
FIG. 5 is a close-up, partial cross-sectional view of the inlet manifold as depicted in FIG. 4.

As illustrated in the cross-sectional view 400 of FIG. 4, as well as in a close-up, partial (broken) cross-sectional view 500 of inlet manifold 150 of FIG. 5, the pump or blower of the system may be connected via connecting interface 152 (e.g. FIG. 4) to the gas flow inlet of inlet manifold 150 at an elevated height $h_i$ (e.g. FIGS. 4-5) relative to the surface of build platform 102 and/or powder bed 110. In particular, the height $h_i$ may represent the distance between the upper edge of the bottom of inlet manifold 150 and the top surface of the powder bed 110. In some embodiments, the height $h_i$ is about four (4) inches (e.g. 4.282 inches); however, the height $h_i$ may be any sufficient height based on the manifold configuration (e.g. between about 3 and 6 inches in the present configuration). In some embodiments, the gas flow inlet of inlet manifold 150 is connected to the pump or blower at the height $h_i$ in order to create space (e.g. beneath the inlet manifold 150) to accommodate additional structures or components of the system. In alternative embodiments, the space beneath the inlet manifold 150 remains empty or devoid of any pertinent structures or components of the system.

As further illustrated in FIGS. 4-5, each one of stacked gas flow guides 202 of the gas flow guide structure may be defined by top and bottom guide plates (e.g. guide plates 220, 222, 224, 226, and 228 of FIG. 4) that are oriented downwards (e.g. from the height $h_i$) at an angle A relative to the direction of a gas flow 402 provided at the gas flow inlet. In some embodiments, the angle A is relative to a direction of gas flow 402 that is parallel to the surface of build platform 102 and/or powder bed 110. In the embodiment as indicated in FIGS. 4-5, the angle A may be about thirty-five (35) degrees. In some embodiments, the angle A at which the top and the bottom guide plates are oriented relative to the direction of the gas flow at the gas flow inlet may be between about twenty (20) and seventy (70) degrees.

Accordingly, each one of stacked gas flow guides 202 include top and bottom guide plates that are oriented downwards at the angle A to guide the gas flow 402 downwards towards the gas flow outlet. As indicated in FIG. 5, for example, gas flow 402 at the gas flow inlet is shown to be separated into a gas flow 404 through stacked gas flow guide 214 and a gas flow 406 through stacked gas flow guide 212; these gas flows 404 and 406 are guided downwards at the angle A towards the gas flow outlet. In some embodiments, each of the top and bottom guide plates has a length (i.e. from inlet to outlet) that is sufficient to stabilize (an otherwise unsettled or turbulent) gas flow provided at the gas flow inlet. In some embodiments, the length is about three (3) inches (e.g. 3.5 inches); however, the length may be any sufficient length according to the manifold configuration (e.g. between about 3 and 6 inches in the present configuration). In the present configuration, inlet manifold 150 may have a width (e.g. extending between the mounting brackets) of about seventeen (17) inches (e.g. 17.540 inches); however, the width may be any sufficient width according to the manifold configuration (e.g. between about 13 and 25 inches).

In some embodiments, at least some of the top and the bottom guide plates of the stacked gas flow guides 202 have upwardly curved ends at the gas flow outlet to redirect the gas flow to be substantially parallel to the surface of build platform 102 and powder bed 110. For example, guide plate 222 of stacked gas flow guide 214 has an upwardly curved end 215 to redirect the gas flow to be substantially parallel to the surface of build platform 102 and powder bed 110 (see e.g. a redirected gas flow 408 from stacked gas flow guide 214 in FIG. 5). In some embodiments, many, most or all of the top and the bottom guide plates of the stacked gas flow guides 202 have upwardly curved ends at the gas flow outlet.

In some embodiments, the upwardly curved ends at the gas flow outlet may be upwardly curved at an angle B relative to the direction of the downwards orientation of the guide plates (e.g. relative to straight or uncurved portions of at least some of the top and the bottom guide plates). In the embodiment indicated in FIG. 5, the upwardly curved ends may be upwardly curved at the angle B which is about thirty-five (35) degrees. In some embodiments, the upwardly curved ends may be upwardly curved at the angle B of between about twenty (20) and seventy (70) degrees. In some embodiments, the angle B (i.e. the upwards angle) may be substantially the same as the angle A (i.e. the downwards angle) to properly redirect the gas flow to be substantially parallel to the surface of build platform 102 and powder bed 110.

Advantageously, at least some of the top and the bottom guide plates having the upwardly curved ends at the gas flow outlet to redirect the gas flow are configured to produce a laminar gas flow 420 of gas above the surface of build platform 102 as indicated in FIGS. 4-5.

In some embodiments as illustrated in FIG. 5, a bottom one of the stacked gas flow guides 202 has a bottom guide plate that maintains a straight or uncurved end at the gas flow outlet. For example, guide plate 220 of stacked gas flow guide 212 may maintain a straight or uncurved end to facilitate a gas flow 410 closer toward the surface of powder bed 110. In some embodiments, each bottom one of the stacked gas flow guides 202 has a bottom guide plate with a straight or uncurved end at the gas flow outlet.

In some further embodiments as illustrated in FIG. 5, an inlet height y of each bottom one of the stacked gas flow guides may be less than an inlet height w of each of the other stacked gas flow guides 202. In some preferred embodiments, the inlet height y of each bottom one of the stacked gas flow guides 202 may be at least twice as less than the inlet height w of each of the other stacked gas flow guides 202. In addition, an outlet height z of each bottom one of the stacked gas flow guides 202 may be greater than an outlet height x of each of the other stacked gas flow guides 202. In some preferred embodiments, the outlet height z of each bottom one of the stacked gas flow guides 202 may be at least twice as great as the outlet height x of each of the other stacked gas flow guides 202. Such differences in the inlet heights y and w and/or outlet heights z and x may provide for a reduced gas flow or pressure through each bottom one of the stacked gas flow guides 202, as gas flow 410 is directed in closer proximity toward the surface of powder bed 110.

Accordingly, as illustrated and described herein, the gas flow guide structure of inlet manifold 150 has a swept geometry to improve laminar gas flow and decrease turbulence across powder bed 110. The gas flow guide structure of inlet manifold 150 causes the gas flow to exit substantially parallel to (e.g. rather than directly into) powder bed 110. In addition, the use of inlet manifold 150 causes the build chamber of the system to remain much cleaner during processing. Also advantageously, the use of inlet manifold 150 may result in fewer component build failures due to incomplete powder recoating. In some cases, the gas flow rate may be increased by up to 100% without any disruption to powder bed 110. Based on observation and consideration of multiple factors, the gas flow rate was able to be increased by about 33% using inlet manifold 150.

Figure 6:
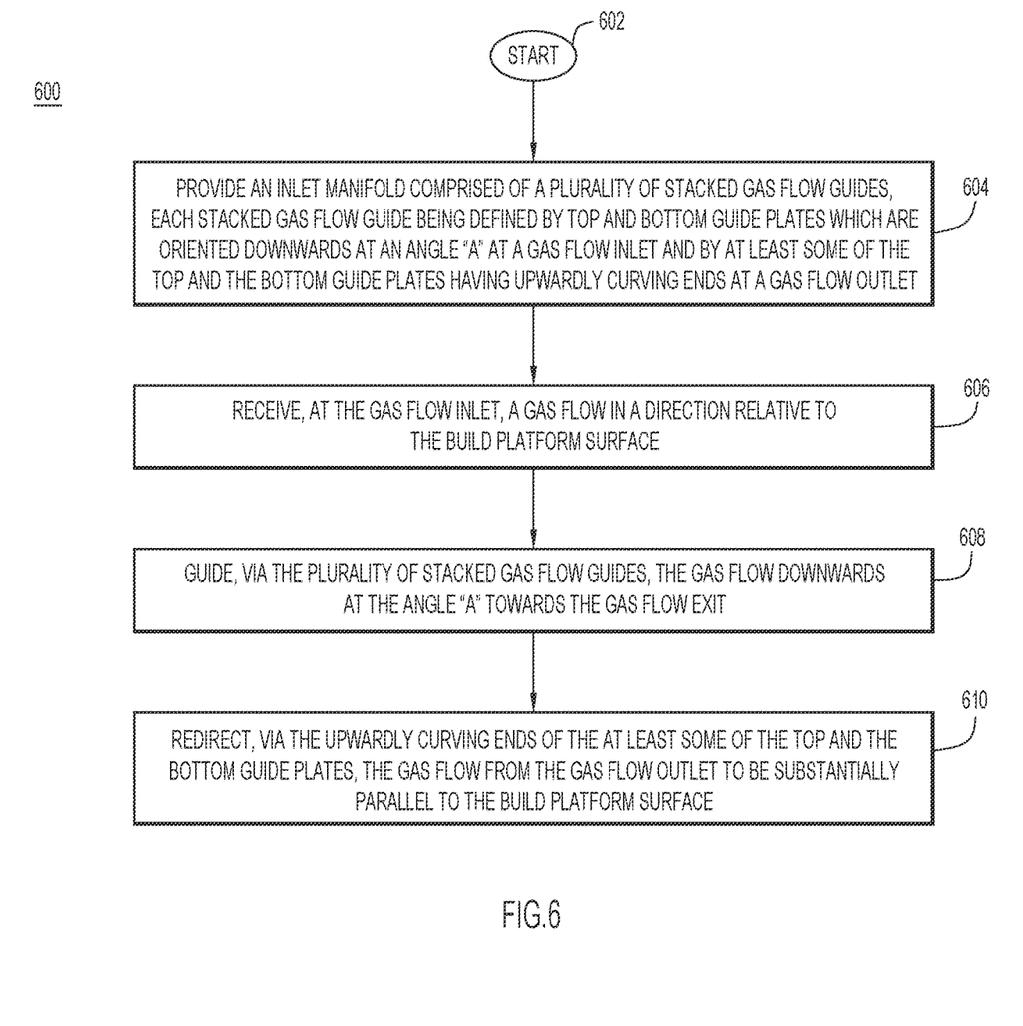
FIG. 6 is a flowchart for describing a method of producing a laminar gas flow over a powder bed carried on a surface of a build platform of a laser powder bed fusion system with use of an inlet manifold according to some embodiments.

FIG. 6 is a flowchart 600 for describing a method of producing a laminar gas flow over a powder bed carried on a build platform of a laser powder bed fusion system with use of an inlet manifold according to some embodiments. In some embodiments, the method of FIG. 6 may be performed with use of the laser powder bed fusion system and the inlet manifold described above in relation to FIGS. 1-5.

Beginning at a start block 602 of FIG. 6, an inlet manifold according to some embodiments is provided for use in a laser powder bed fusion system (step 604 of FIG. 6). In some embodiments, the inlet manifold is made of a gas flow guide structure comprised of a plurality of stacked gas flow guides, where each stacked gas flow guide is defined by top and bottom guide plates which are oriented downwards at an angle A at a gas flow inlet and by at least some of the top and the bottom guide plates having upwardly curved ends at a gas flow outlet. The inlet manifold of the laser powder bed fusion system may receive, at the gas flow inlet, the gas flow in a direction relative to the build platform (step 606 of FIG. 6). The inlet manifold may guide, via the plurality of stacked gas flow guides, the gas flow downwards at the angle A towards the gas flow outlet (step 608 of FIG. 6). The inlet manifold may redirect, via the upwardly curved ends of the at least some of the top and the bottom guide plates of each stacked gas flow guide, the gas flow from the gas flow outlet to be substantially parallel to the build platform (step 610 of FIG. 6).

In some embodiments, for guiding the gas flow in step 608, the inlet manifold has a number of stacked gas flow guides of between four (4) and twelve (12). In some embodiments, for guiding the gas flow in step 608, the gas flow guide structure further includes a plurality of vertical guide plates to separate the plurality of stacked gas flow guides into a plurality of horizontally-separated, vertically-stacked gas flow guide stacks. In some embodiments, for guiding the gas flow in step 608, the angle A at which the top and the bottom guide plates are oriented relative to the direction of the gas flow may be between about twenty (20) and seventy (70) degrees. In some embodiments, for redirecting the gas flow in step 610, the upwardly curved ends at the gas flow outlet are curved upwards at an angle B relative to straight or uncurved portions of the at least some of the top and the bottom guide plates of between about twenty (20) and seventy (70) degrees.

Figure 7A:
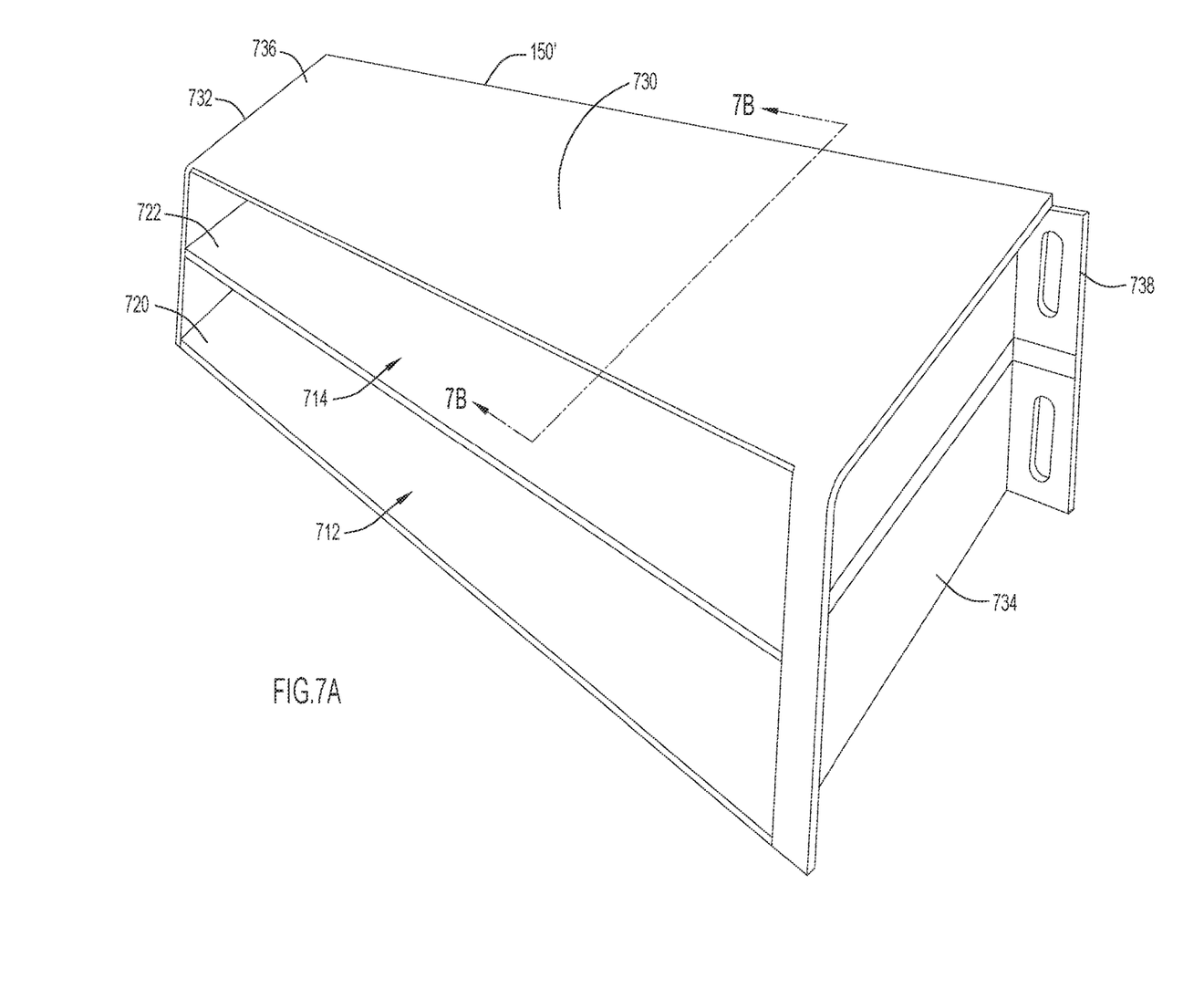
FIG. 7A is a perspective view of an inlet manifold of the prior art, taken from front and right sides.
Figure 7B:
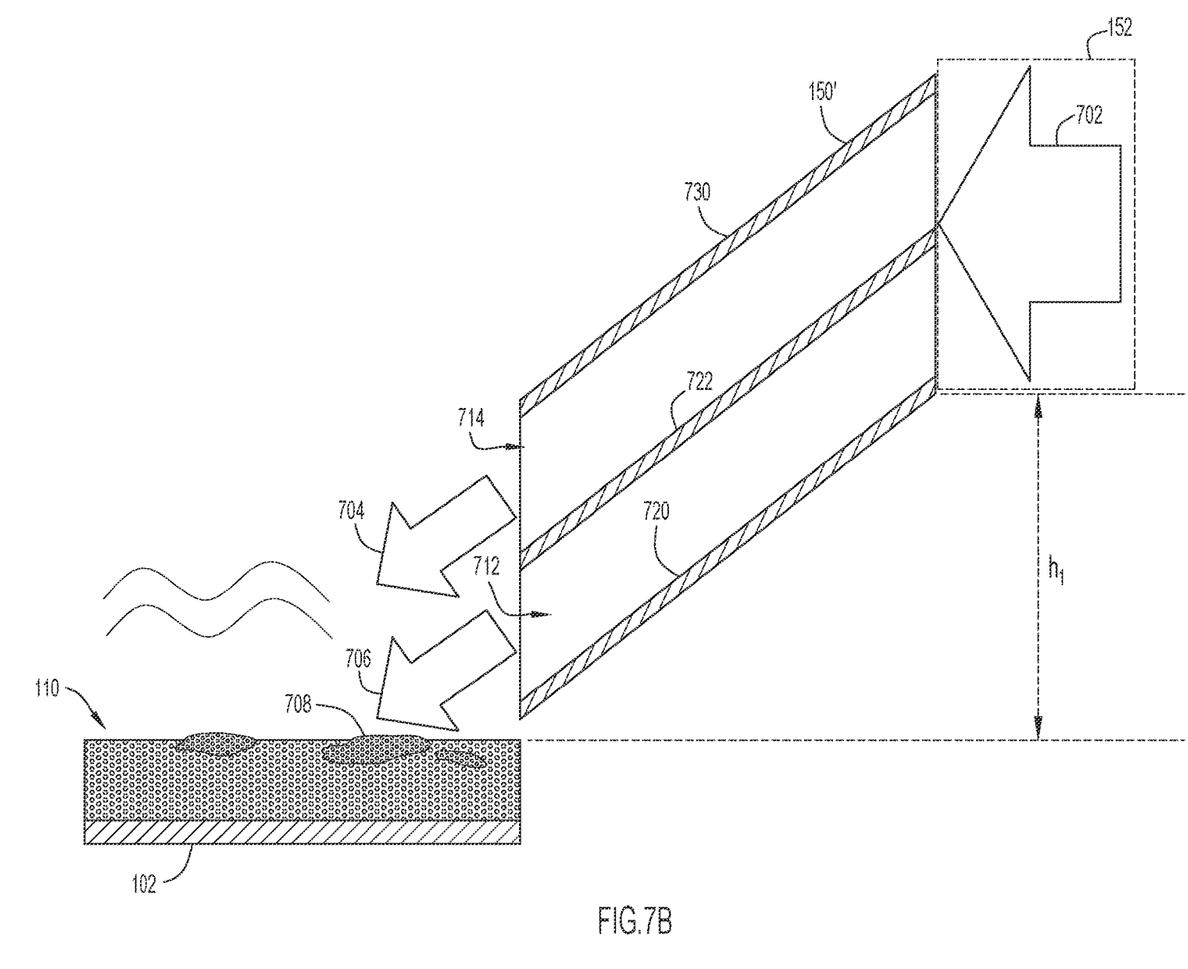
FIG. 7B is a cross-sectional view of the inlet manifold of the prior art, taken along a line 7B-7B of FIG. 7A.

For comparative purposes, a perspective view of an inlet manifold 150' of the prior art taken from front and right sides is shown in FIG. 7A, together with a cross-sectional view of inlet manifold 150' in FIG. 7B which is taken along a line 7B-7B of FIG. 7A. Inlet manifold 150' of FIGS. 7A-7B is made of a folded and welded sheet metal structure having first and second gas flow guides 712 and 714. First gas flow guide 712 is defined by sheet metal plates 720 and 722, and second gas flow guide 714 is defined by sheet metal plates 722 and 730, where sheet metal plate 730 forms a top plate of inlet manifold 150'. Left and right sides of first and second gas flow guides 712 and 714 are further defined by left and right sheet metal plates 732 and 734 of inlet manifold 150'. Inlet manifold 150' also includes pairs of mounting brackets 736 and 738 on left and right sides thereof, respectively, which may be used for mounting inlet manifold 150' in the laser powder bed fusion system of FIG. 1.

In FIG. 7B, a gas flow 702 is shown to enter into inlet manifold 150' and directed at a downwards angle by first and second gas flow guides 712 and 714 as gas flows 704 and 706 towards powder bed 110. In many cases, the use of inlet manifold 150' results in a turbulent gas flow and an uneven powder bed having disrupted powder bed portions 708. Thicker layers of powder result in a greater quantity of ejected condensate and require higher gas flow rates of gas flow 702 to keep the laser path clear. At higher velocities, gas flow 702 disrupts the powder bed and stirs up airborne particulate matter, resulting in a significant amount of welding spatter to land on and be incorporated into printed components. The printed components may turn out to have undesirable material properties.

In contrast, with use of an inlet manifold according to some embodiments of the present disclosure, a reduced or eliminated flow turbulence and an improved debris removal for producing printed components having desirable material properties may be achieved.

To better illustrate by example, tensile testing was performed on component samples that were produced with use of a laser powder bed fusion system having the inlet manifold according to some embodiments. Example tensile results from the testing are provided below in Table 1.

TABLE 1

Example tensile results of component samples according to the present disclosure.
Tensile Results

| Sample | Inlet Manifold Installed | Airflow (mBar) | Ultimate Tensile Strength (ksi) | Yield (ksi) | % Elongation | % Reduction Of Area | Modulus (msi) |
| --- | --- | --- | --- | --- | --- | --- | --- |
| 1 | Old | 3.00 | 38.60 | 24.00 | 15.50 | 26.30 | 9.10 |
| 2 | New | 3.00 | 38.90 | 22.60 | 15.40 | 25.90 | 9.40 |
| 3 | New | 3.50 | 39.20 | 24.00 | 16.00 | 32.00 | 10.60 |
| 4 | New | 4.00 | 38.90 | 22.30 | 16.40 | 28.70 | 9.40 |
| 5 | New | 4.50 | 38.90 | 23.60 | 16.40 | 29.60 | 10.00 |
| 6 | New | 5.00 | 39.60 | 23.20 | 15.10 | 28.00 | 9.90 |
| 7 | New | 5.50 | 38.70 | 23.50 | 15.90 | 25.60 | 9.60 |
| 8 | New | 6.00 | 40.00 | 23.10 | 16.20 | 30.00 | 10.60 |
| Average | | | 39.10 | 23.29 | 15.86 | | |

The tensile results of Table 1 reveal no trending in material properties with the change of hardware or increase in gas flow rate. It is reasonable to conclude that the significant reduction in gas flow turbulence allows the gas flow rate to be increased significantly without fine powder particles being blown from the powder bed.

Techniques and mechanisms for producing a laminar gas flow over a powder bed carried on a build platform of a laser powder bed fusion system with use of an inlet manifold have been described. In one illustrative example, an inlet manifold is configured for use in a laser powder bed fusion system having a build platform for carrying a powder bed and a pump or blower for supplying a gas flow in a direction relative to the build platform. The inlet manifold has a gas flow guide structure which includes a gas flow inlet to receive the gas flow. The gas flow guide structure is comprised of a plurality of stacked gas flow guides, where each stacked gas flow guide is defined by top and bottom guide plates oriented downwards at an angle A relative to the direction of the gas flow to guide the gas flow downwards towards a gas flow outlet. At least some of the top and the bottom guide plates of the stacked gas flow guides have upwardly curved ends at the gas flow outlet to redirect the gas flow to be substantially parallel to a surface of the build platform.

In another illustrative example, a method for producing a laminar gas flow over a powder bed carried on a build platform of a laser powder bed machine having a pump or blower for supplying a gas flow into an inlet manifold is described. The inlet manifold has a gas flow guide structure comprised of a plurality of stacked gas flow guides, where each stacked gas flow guide is defined by top and bottom guide plates which are oriented downwards at an angle A at a gas flow inlet and by at least some of the top and the bottom guide plates having upwardly curved ends at a gas flow outlet. The method involves receiving, at the gas flow inlet of the gas flow guide structure, the gas flow in a direction relative to a surface of the build platform; guiding, via the plurality of stacked gas flow guides of the gas flow guide structure, the gas flow downwards at the angle A towards the gas flow outlet; and redirecting, via the upwardly curved ends of the at least some of the top and the bottom guide plates, the gas flow from the gas flow outlet to be substantially parallel to the surface of the build platform.

In yet another illustrative example, a laser powder bed fusion system comprises a build chamber having a build platform to carry a powder bed, a laser device to produce a laser beam to fuse layers of powder from the powder bed, a pump or blower to supply a gas flow in a direction relative to a surface of the build platform, and an inlet manifold having a gas flow inlet to connect to the pump or blower to receive the gas flow. The inlet manifold has a gas flow guide structure comprised of a plurality of stacked airflow guides. Each stacked gas flow guide is defined by top and bottom guide plates oriented downwards at an angle A relative to a direction of the gas flow to guide the gas flow downwards towards a gas flow outlet into the build chamber. At least some of the top and the bottom guide plates have upwardly curved ends at the gas flow outlet to redirect the gas flow to be substantially parallel to the surface of the build platform.

The invention claimed is:

1. An inlet manifold configured for use in a laser powder bed fusion system having a build platform for carrying a powder bed and a pump or blower for supplying a gas flow in a direction relative to a surface of the build platform, the inlet manifold comprising:
 a gas flow guide structure having a gas flow inlet to receive the gas flow;
 the gas flow guide structure being comprised of a plurality of stacked gas flow guides, each stacked gas flow guide being defined by top and bottom guide plates;
 the top and the bottom guide plates having a slanted portion that is oriented downwards at an angle A relative to the build platform to guide the gas flow downwards towards a gas flow outlet; and at least some of the top and the bottom guide plates of the stacked gas flow guides having a curved portion extending from the slanted portion, the curved portion redirecting the gas flow to be substantially parallel to the surface of the build platform at the gas flow outlet, wherein the bottom guide plate of the bottom one of the stacked gas flow guides is entirely slanted relative to the build platform.

2. The inlet manifold of claim 1, wherein the at least some of the top and the bottom guide plates having the curved portion to redirect the gas flow are configured to produce a laminar gas flow above the surface of the build platform.

3. The inlet manifold of claim 1, wherein the number of the stacked gas flow guides in a vertical direction is between four and twelve.

4. The inlet manifold of claim 1, wherein the gas flow guide structure has a plurality of vertical guide plates to separate the plurality of stacked gas flow guides into a plurality of horizontally-separated, vertically-stacked gas flow guide stacks.

5. The inlet manifold of claim 1, wherein the angle A at which the top and the bottom guide plates are oriented relative to the build platform is between about twenty and seventy degrees.

6. The inlet manifold of claim 1, wherein the curved portion is curved at an angle B of between about twenty and seventy degrees relative to the slanted portion of the top and the bottom guide plates.

7. The inlet manifold of claim 1, wherein the gas flow guide structure is an integrally-formed, additively-manufactured unit.

8. A method of producing a laminar gas flow over a powder bed carried on a build platform of a laser powder bed fusion system having a pump or blower for supplying a gas flow into an inlet manifold, the inlet manifold having a gas flow guide structure comprised of a plurality of stacked gas flow guides, each stacked gas flow guide being defined by top and bottom guide plates, the top and bottom guide plates having a slanted portion that is oriented downwards at an angle A relative to the build platform, wherein at least some of the top and the bottom guide plates include a curved portion extending from the slanted portion, wherein the bottom guide plate of the bottom one of the stacked gas flow guides is entirely slanted relative to the build platform, the method comprising:

receiving, at the gas flow inlet of the gas flow guide structure, the gas flow in a direction relative to a surface of the build platform;

guiding, via the plurality of stacked gas flow guides of the gas flow guide structure, the gas flow downwards at the angle A towards the gas flow outlet; and redirecting, via the curved portion of the at least some of the top and the bottom guide plates, the gas flow from the gas flow outlet to be substantially parallel to the surface of the build platform at a gas flow outlet.

9. The method of claim 8, wherein for guiding the gas flow, the number of the stacked gas flow guides in a vertical direction is between four and twelve.

10. The method of claim 9, wherein for guiding the gas flow, the gas flow guide structure has a plurality of vertical guide plates to separate the plurality of stacked gas flow guides into a plurality of horizontally-separated, vertically-stacked gas flow guide stacks.

11. The method of claim 8, wherein for guiding the gas flow, the angle A at which the top and the bottom guide plates are oriented relative to the direction of the gas flow is between about twenty and seventy degrees.

12. The method of claim 8, wherein for redirecting the gas flow, the curved portions being curved at an angle B of between about twenty and seventy degrees relative to the slanted portion of the top and the bottom guide plates.

13. A laser powder bed fusion system comprising:
a build chamber having a build platform to carry a powder bed;
a laser device to produce a laser beam to fuse layers of powder from the powder bed;
a pump or blower to supply a gas flow in a direction relative to a surface of the build platform;
an inlet manifold having a gas flow guide structure which includes a gas flow inlet to connect to the pump or blower to receive the gas flow, the gas flow guide structure being comprised of a plurality of stacked airflow guides, wherein:
each stacked gas flow guide is defined by top and bottom guide plates,
the top and the bottom guide plates having a slanted portion that is oriented downwards at an angle A relative to the build platform to guide the gas flow downwards towards a gas flow outlet into the build chamber, and
at least some of the top and the bottom guide plates have a curved portion to redirect the gas flow to be substantially parallel to the surface of the build platform at the gas flow outlet,
wherein the bottom guide plate of the bottom one of the stacked gas flow guides is entirely slanted relative to the build platform.

14. The laser powder bed fusion system of claim 13, wherein the at least some of the top and the bottom guide plates having the curved portion to redirect the gas flow are configured to produce a laminar gas flow over the powder bed.

15. The laser powder bed fusion system of claim 13, wherein the inlet manifold comprised of the gas flow guide structure has a plurality of vertical guide plates to separate the plurality of stacked gas flow guides into a plurality of horizontally-separated, vertically-stacked gas flow guide stacks.

16. The laser powder bed fusion system of claim 13, wherein the angle A at which the top and the bottom guide plates are oriented relative to the direction of the gas flow is between about twenty and seventy degrees.

17. The laser powder bed fusion system of claim 13, wherein the curved portion are curved upwards at an angle B of between about twenty and seventy degrees relative to the slanted portion of the top and the bottom guide plates.

18. The laser powder bed fusion system of claim 13, wherein the gas flow guide structure of the inlet manifold is an integrally-formed, additively-manufactured unit.

19. The inlet manifold of claim 1, wherein the bottom one of the stacked gas flow guides has an inlet height less than an inlet height of each of the other stacked gas flow guides.

20. The laser powder bed fusion system of claim 13, wherein the bottom one of the stacked gas flow guides has an inlet height less than an inlet height of each of the other stacked gas flow guides.

* * * * *